United States Patent [19]

Shibata

[11] Patent Number: 5,273,091
[45] Date of Patent: Dec. 28, 1993

[54] BISCUIT JOINTER

[75] Inventor: Yoshinori Shibata, Anjo, Japan

[73] Assignee: Makita Corporation, Anjo, Japan

[21] Appl. No.: 963,811

[22] Filed: Oct. 20, 1992

[30] Foreign Application Priority Data

Oct. 21, 1991 [JP] Japan .............. 3-094530[U]

[51] Int. Cl.$^5$ .................. B27C 5/00; B27M 1/00
[52] U.S. Cl. ................... 144/136 C; 144/137; 144/371; 409/175
[58] Field of Search ............ 409/175, 179, 182, 190; 144/1 C, 1 E, 1 F, 134 D, 136 C, 137, 371

[56] References Cited

U.S. PATENT DOCUMENTS

| | | | |
|---|---|---|---|
| 4,858,661 | 8/1989 | Bosten et al. | 144/134 D |
| 4,858,662 | 8/1989 | Bosten et al. | 144/136 C |
| 4,858,663 | 8/1989 | Bosten et al. | 144/136 C |
| 4,913,204 | 4/1990 | Moores et al. | 144/136 C |
| 4,926,916 | 5/1990 | Legler et al. | 144/136 C |
| 4,947,908 | 8/1990 | O'Banion et al. | 144/353 |
| 4,971,122 | 11/1990 | Sato et al. | 144/136 C |
| 4,977,938 | 12/1990 | Greeson | 409/182 |

FOREIGN PATENT DOCUMENTS 2-124104 9/1989 Japan .
1-29042 10/1990 Japan .

Primary Examiner—W. Donald Bray
Attorney, Agent, or Firm—Lahive & Cockfield

[57] ABSTRACT

The present invention provides an improved biscuit jointer which allows a ruler guide to be kept completely level during fine adjustment of the vertical position and angular orientation of the ruler guide with respect to a ruler and accurately abuts against a workpiece. The biscuit jointer of the invention includes: a circular cutter blade; a base accommodating the cutter blade; a housing containing a motor for driving the cutter blade and being slidable relative to the base; a ruler disposed on one end of the base to abut against an end face of a workpiece; and a ruler guide vertically slidable along the ruler. The ruler has a vertically extending slide edge plane on a predetermined end thereof, and the ruler guide has a linear guide on the predetermined end thereof, which slides against the slide edge plane. The ruler grade further includes a spur gear engaging with a toothed rack formed on the ruler, which allows vertical movement of the ruler guide along the ruler. A leaf spring applies pressure against the contact of the linear guide with the slide edge plane to secure the attachment of the ruler guide to the ruler. The biscuit jointer is further provided with a clamp to restrain the movement of the ruler guide relative to the ruler.

18 Claims, 8 Drawing Sheets

BISCUIT JOINTER

BACKGROUND OF THE INVENTION

Field of the Invention

The present invention relates to a plate jointer or a biscuit jointer for plunge cutting semi-elliptical slots in opposing edges of two workpieces, which respectively accept an oval-shaped wafer or plate generally called a biscuit to join the two workpieces together along the opposing edges.

Description of the Related Art

Examples of known biscuit jointers and plate jointers include Japanese Utility Model Publication Gazette No. Hei-01-29042, U.S. Pat. Nos. 4,858,661, 4,971,122, and 4,913,204.

A typical biscuit jointer shown in FIG. 7 includes: a circular cutter blade 115 rotatably accommodated in a base 116; a housing 110 containing a motor 112 for driving the cutter blade 115; a pair of fence supporting members or a pair of ruler guides 119, each having a vertically elongated slot, upstandingly extending from the front side ends of the base 116; and a fence or a ruler 114 fixed to the fence supporting members 119, as disclosed in U.S. Pat. No. 4,971,122. The fence supporting members 119 are secured to the base 116 with bolts. The fence 114 is fixed to the fence supporting members 119 by means of fence fixing means 120 like bolts inserted into the vertically elongated slots of the fence supporting members 119 and is slidably moved in vertical direction along the vertically elongated slots of the fence supporting members 119 by loosening the fence fixing means 120.

In the structure of such known biscuit jointers, it is not easy to make the fence completely level with respect to the fence supporting members since there is a little play between the vertically elongated slots of the fence supporting members and the fence fixing means when the fence fixing means are loosened. The height of the fence, that is, the vertical bolting positions thereof, are thereby adjusted using scales mounted on either side of the fence supporting members. This procedure requires certain skill and time. When a groove or a slot is cut on the upper surface of a flat workpiece, the fence is to be removed from the fence supporting members by completely loosening the fence fixing means. This also consumes labor and time.

An improved ruler guide assembly further includes an upright linear guide mounted on between the ruler and the ruler guide. Even in this improved structure, since there is a little play between the ruler guide and the linear guide, thorough check of the vertical position and orientation of the ruler using the scales mounted on either side of the ruler guide is essential for fixation of the ruler at the accurate position and angle. When the fixation position or angle is inadequate, a certain force or shock may vary the bolting force to move the ruler.

In a power biscuit jointer cutter of U.S. Pat. No. 4,913,204 shown in FIG. 8, a fence or ruler 214 is vertically slidable along a pair of rack and pinion arrangements formed between a guide plate 260 and a carrier 274 and is fixed at a desirable position with clamp means. The high working accuracy and precision of racks 310 is required for ensuring the sufficient horizontality of the fence 214, but this requires skill and relatively long working time. There is a little play between vertical edge sections 308 of the guide plate 260 and vertical grooves of the carrier 274 when the clamp means are loosened, and this causes difficulty in making the fence 214 completely level with respect to the rack and pinion arrangements.

SUMMARY OF THE INVENTION

The primary object of the invention is thus to provide an improved biscuit jointer in which a fine adjustment and control mechanism is smoothly movable in vertical direction and is efficiently operable.

A specific object of the invention is to ensure sufficient horizontality of a ruler guide with respect to a ruler.

The above and other related objects are realized by a biscuit jointer of the invention, which includes: a circular cutter blade; a base accommodating the cutter blade; a housing containing a motor for driving the cutter blade and being slidable relative to the base; a ruler disposed on one end of the base to abut against an end face of a workpiece; and a ruler guide abutting against a plane perpendicular to the end face of the workpiece to be vertically slidable along the ruler. In such a biscuit jointer, either the ruler or the ruler guide has a slide edge plane on a predetermined end thereof, and the other of the ruler or the ruler guide has a linear guide on the predetermined end thereof, which slides against the slide edge plane. A feed gear mechanism is arranged between the ruler and the ruler guide so as to move either the ruler or the ruler guide relative to the ruler guide or the ruler in vertical direction. Spring means is further disposed to apply pressure against the contact of the linear guide with the slide edge plane. The movement of the ruler guide or the ruler relative to the ruler or the ruler guide is restrained by a clamping mechanism.

In this structure, the spring means presses against the contact of the slide edge plane with the linear guide. The ruler guide is thus smoothly movable with respect to the ruler in vertical direction by means of the feed gear mechanism, and is accurately fixed at a desired vertical position and angular orientation with the clamping mechanism.

These and other objects, features, aspects, and advantages of the present invention will become more apparent from the following detailed description of the preferred embodiment with the accompanying drawings.

DESCRIPTION OF THE PREFERRED EMBODIMENT

A biscuit jointer embodying the invention is described according to the drawings.

Figure 2:
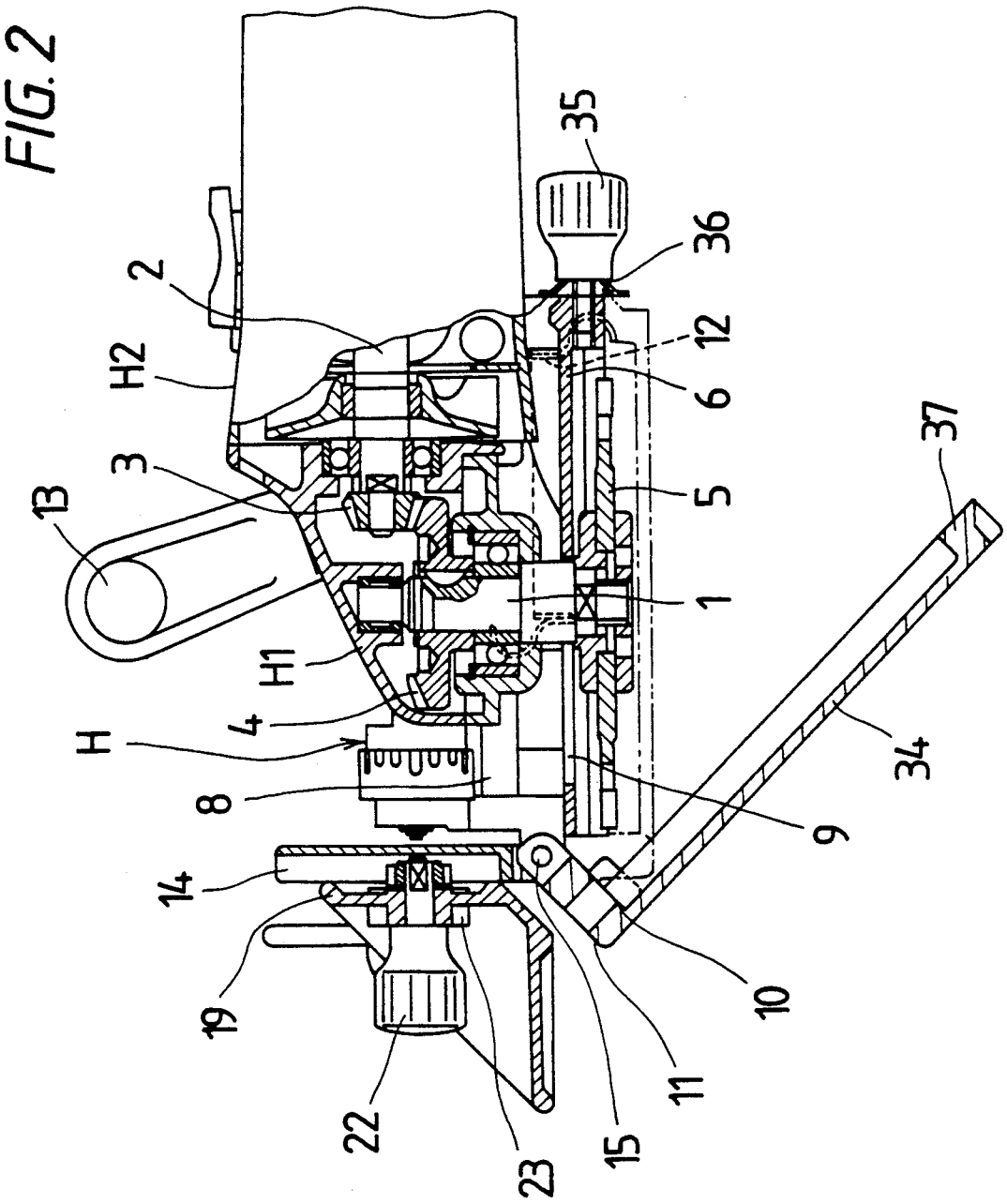
FIG. 2 is a partially sectional side view illustrating the biscuit jointer of FIG. 1.

As shown in the partially sectional side view of FIG. 2, a blade shaft 1 rotatably and perpendicularly supported in a gear housing H1, which forms a front portion of a main body H of a biscuit jointer, is driven to rotate via bevel gears 3 and 4 by a motor 2 accommodated in a motor housing H2 forming a rear portion of the main body H. On the lower end of the blade shaft 1, a circular cutter blade 5 for plunge cutting a semi-elliptical slot in a workpiece is mounted to be rotatable in parallel with the lower surface of the main body H.

The circular cutter blade 5 is accommodated in a base 6, which is located below the gear housing H1 and movable relative to the gear housing H1 in parallel with the rotating surface of the cutter blade 5. Horizontally extending rods 8,8 formed on the base 6 slidably engage with sliding portions 7,7 projecting horizontally from the lower end of the gear housing H1 as clearly seen in the plan view of FIG. 1. A horizontally extending slot 9 which the blade shaft 1 vertically passes through is formed on the center of the upper end of the base 6. The base 6 is slidable relative to the gear housing H1 to expose and conceal the front edge of the cutter blade 5 through a transverse slot-like opening 10 formed in the front wall of the base 6. A front end face 11 of the base 6 is abuttable against an end face of a workpiece.

When the main body H of the biscuit jointer is moved forward to a workpiece, the main body H slides forward relative to the base 6 with guidance of the rods 8, 8 to protrude the front edge of the cutter blade 5 through the transverse opening 10 and cut a slot in the workpiece. On the contrary, when the main body H of the biscuit jointer is moved backward, the base 6 is pressed backward to the original position by means of springs 12,12 disposed between the lower end of the gear housing H1 and the upper end of the base 6 to conceal the front edge of the cutter blade 5 into the transverse opening 10. The main body H of the biscuit jointer further includes a handle grip 13.

Figure 1:
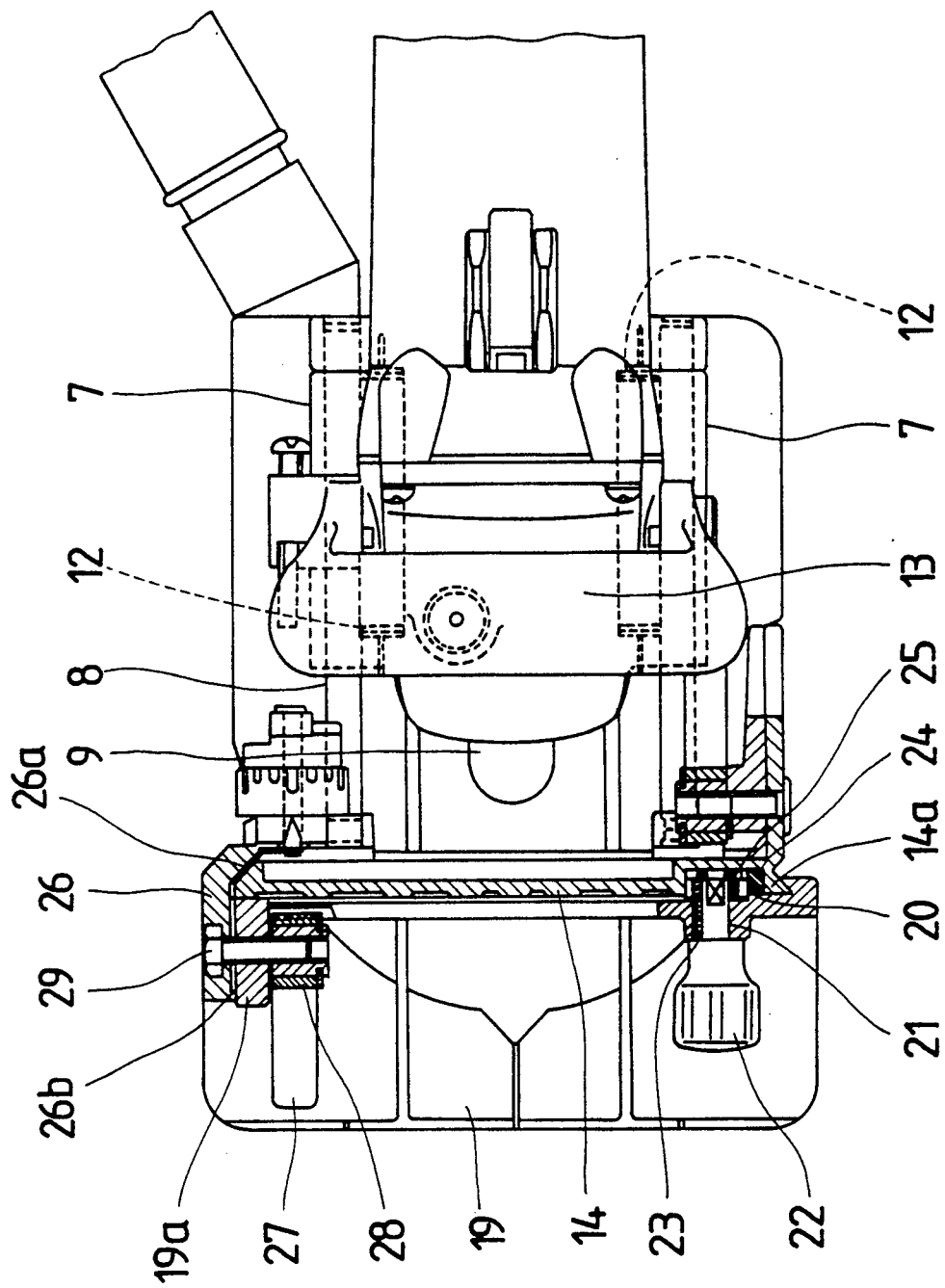
FIG. 1 is a partially sectional plan view showing a biscuit jointer embodying the invention.
Figure 3:
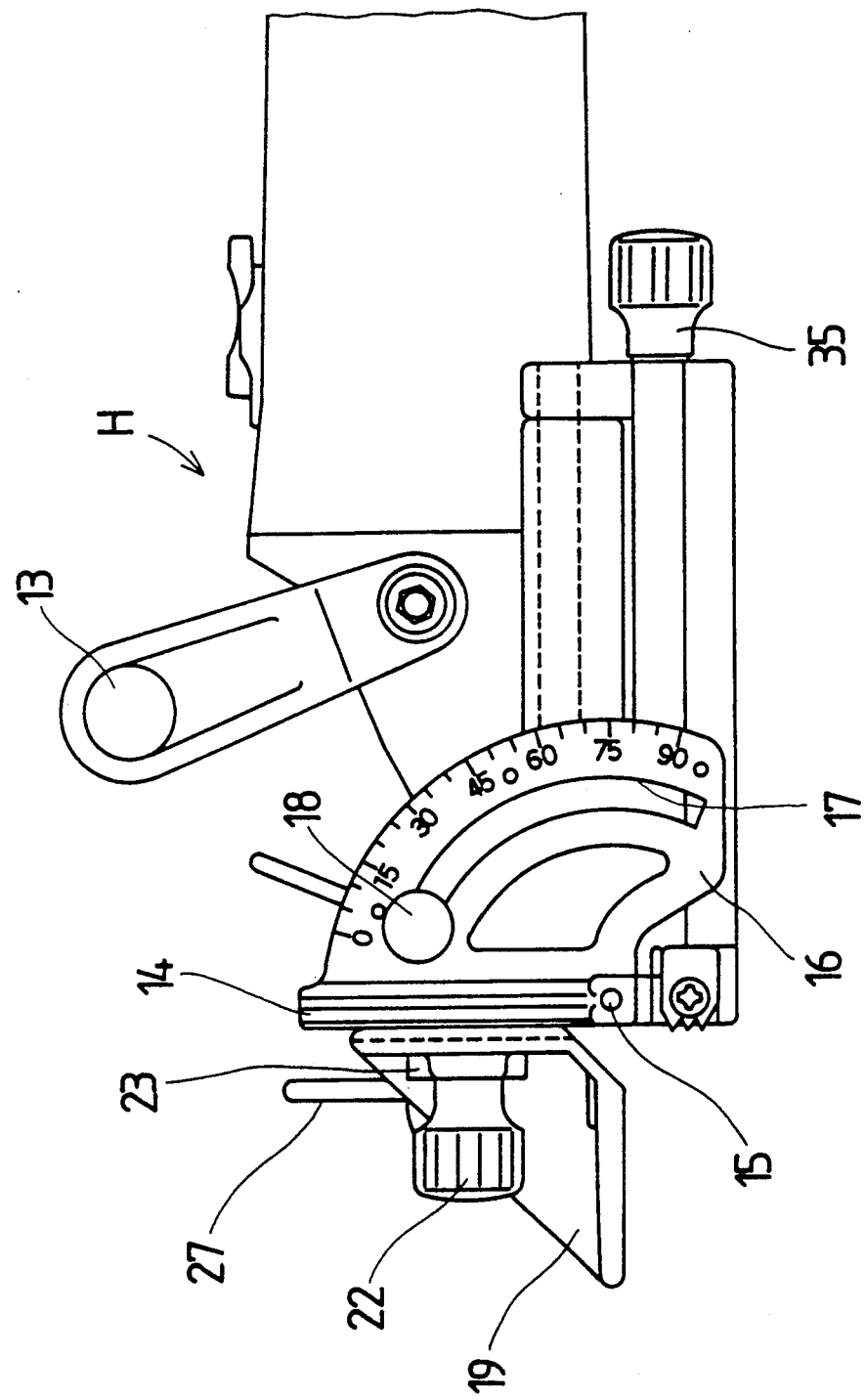
FIG. 3 is a side view illustrating the biscuit jointer of FIG. 1.

As clearly shown in FIGS. 1 and 2, a ruler 14 for defining the cutting position of a semi-elliptical slot in a workpiece is located in the same plane as the front end face 11 of the base 6 abutting against an end face of the workpiece. The ruler 14 is supported about a support axis 15 to move pivotably with respect to the upper front end of the base 6. The ruler 14 has a vertically extending slide edge plane 14a on a predetermined end. A fan-shaped ruler holder 16 extending backward is further attached to the ruler 14 as shown in FIG. 3. The ruler 14 is attached to the base 6 to be pivotable within a range of approximately ninety degrees by means of a bolt 18 passing through a guide hole 17 formed in the ruler holder 16.

A ruler guide 19 abutting against a plane perpendicular to the end face of the workpiece is slidable along the ruler 14 in vertical direction to define the distance between the perpendicular plane and the cutting position. The ruler guide 19 has a linear guide 20 on the predetermined end thereof to engage with the slide edge plane 14a of the ruler 14 and slide the ruler 14 in vertical direction.

Figure 4:
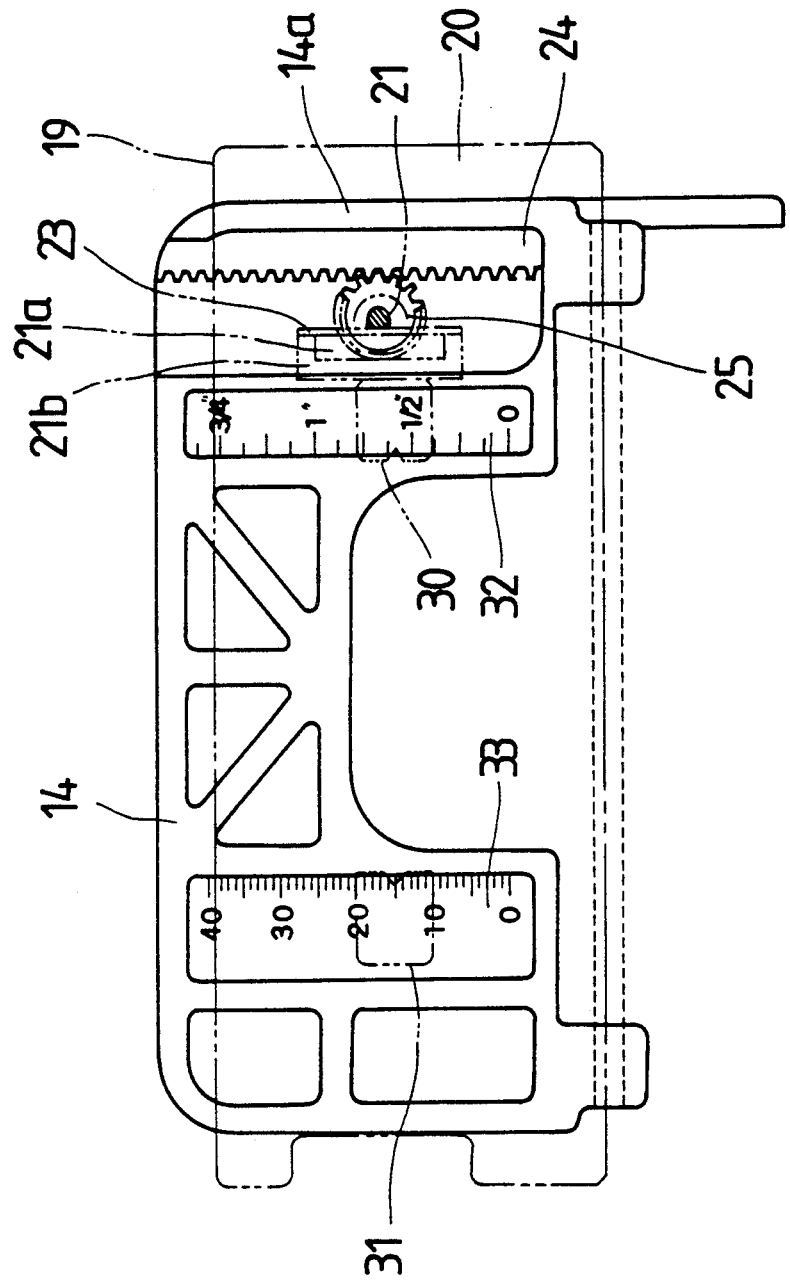
FIG. 4 illustrates rack and pinion arrangement of a ruler and a ruler guide of the biscuit jointer.
Figure 6:
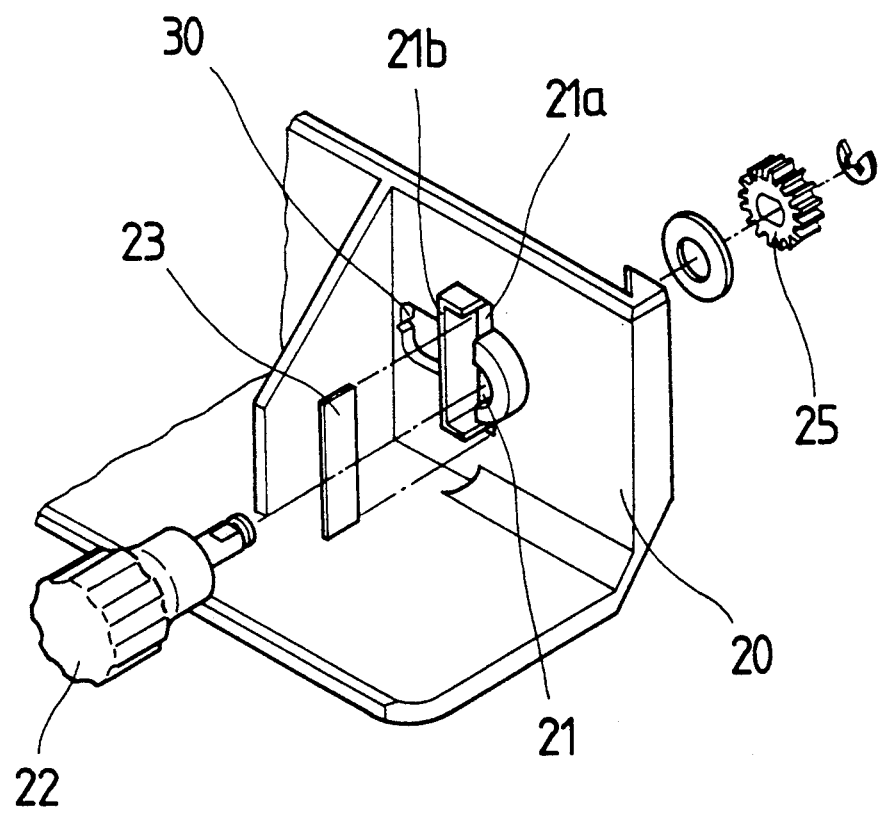
FIG. 6 is a decomposed view illustrating a feed gear mechanism.
Figure 7:
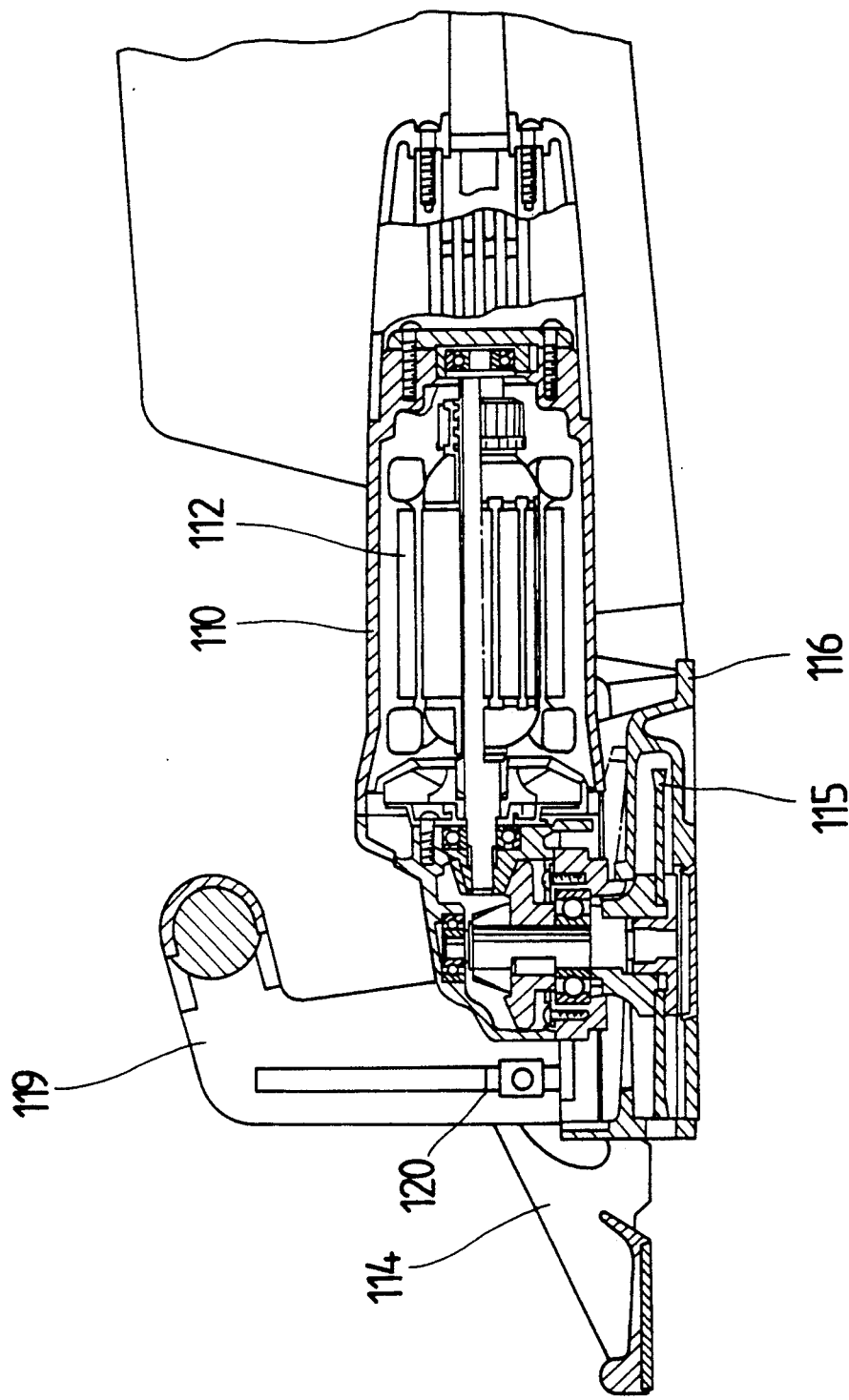
FIG. 7 is a cross sectional view showing structure of a conventional biscuit jointer.
Figure 8:
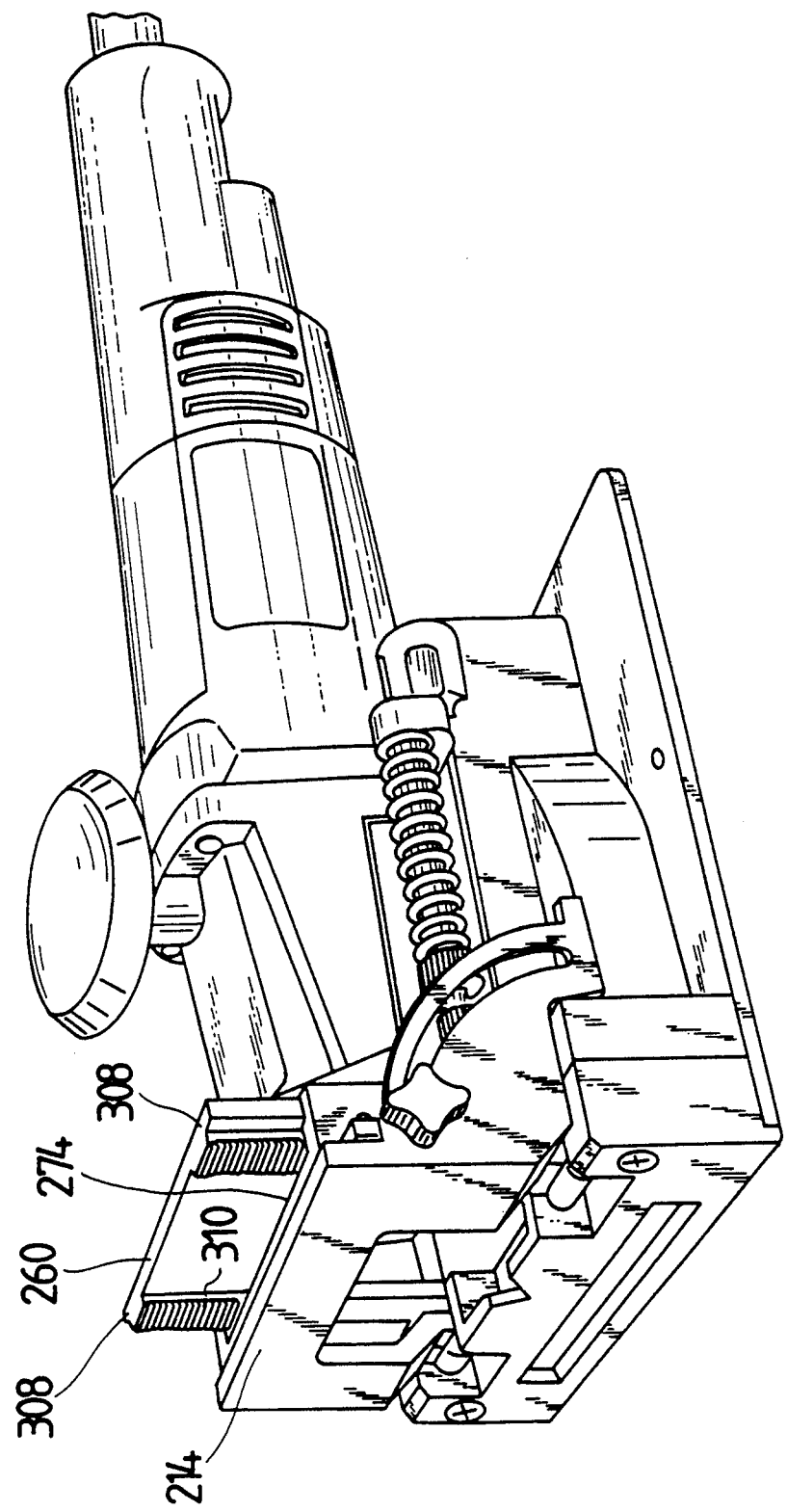
FIG. 8 is a perspective view illustrating another biscuit jointer as prior art.

FIG. 4 is a front view illustrating the ruler 14 and the ruler guide 19 (shown by the two-dot chain line) of the biscuit jointer. A shaft having a screw 22 on one end thereof passes through a guide hole 21 formed in the front wall of the ruler guide 19. The guide hole 21 includes a vertically extending groove 21a at the side opposite to the linear guide 20 as shown in FIG. 6. A leaf spring 23 is attached into the vertical groove 21a to press the screw 22 against the linear guide 20 and thereby apply pressure against the contact of the linear guide 20 with the slide edge plane 14a. Three sides of the vertical groove 21a are surrounded by a U-shaped support wall 21b having a thickness greater than that of the ruler guide 19 to support the base end of the leaf spring 23. The shaft having the screw 22 on one end has, on the other end thereof, a spur gear 25 engaging with a toothed rack 24 formed in the front face of the ruler 14. The spur gear 25 and the toothed rack 24 form a feed gear mechanism to move the ruler guide 19 relative to the ruler 14 in vertical direction.

Figure 5:
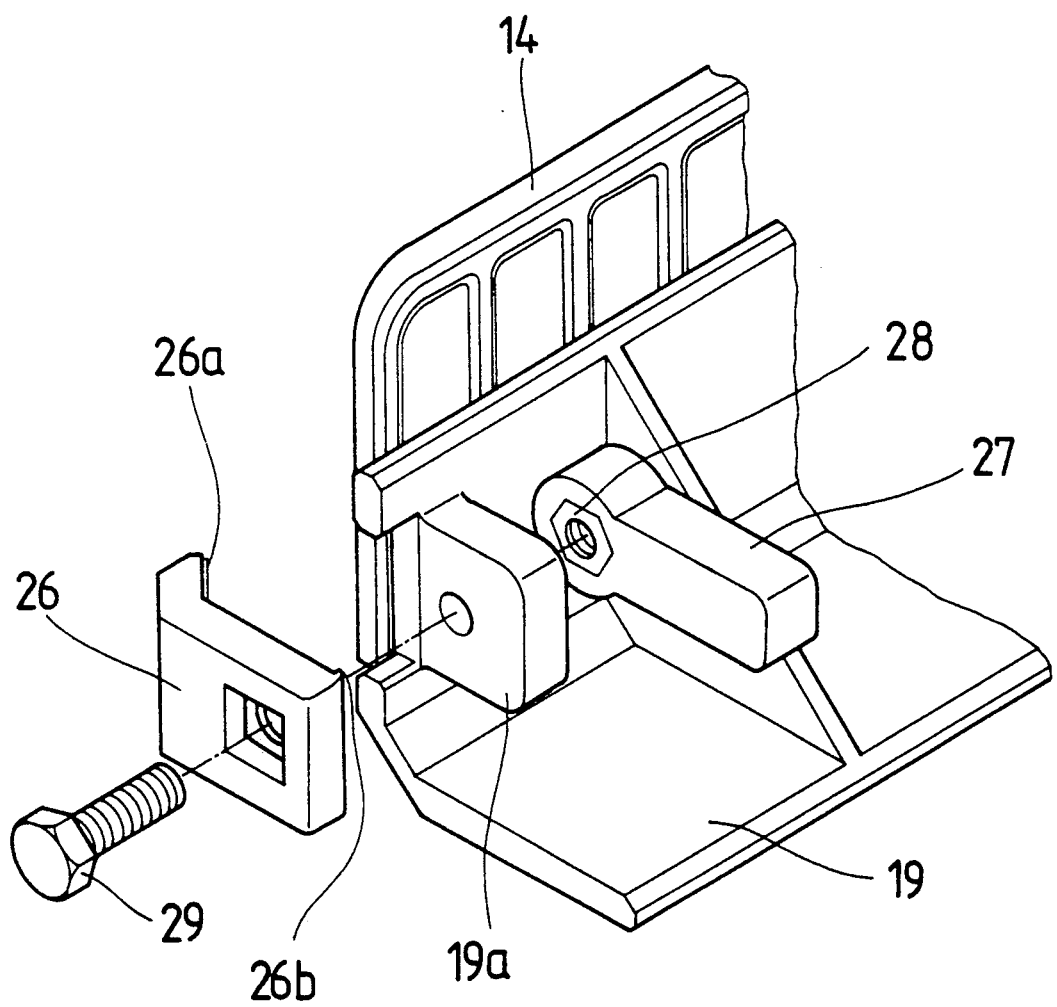
FIG. 5 is a decomposed view illustrating a clamping mechanism to apply pressure against the ruler.

A clamp 26 having a plane 26b is attached to a protrusion 19a projecting forward from the other end of the ruler guide 19 (opposite to the predetermined end having the linear guide 20) by means of a hexagonal nut 28 and a bolt 29 with a hexagon head as shown in the decomposed view of FIG. 5. The clamp 26 presses the other end of the ruler 14 (opposite to the predetermined end having the slide edge plane 14a) in the direction of the linear guide 20. The clamp 26 further includes a urethane rubber sheet 26a on the inner face thereof to secure the fixation to the ruler guide 19. The engagement of the hexagonal nut 28 with the bolt 29 is tightened and loosened with a lever 27. These elements 26, 27, 28, 29 form a clamping mechanism to restrain the movement of the ruler guide 19 relative to the ruler 14. The clamping mechanism allows the ruler guide 19 to be easily attached to and detached from the ruler 14.

Vertically movable windows 30 and 31 shown by the two-dot chain line are respectively formed on the inner side of two legs of the arch-shaped ruler 14. Scales 32 and 33 of two different units, that is, inch and centimeter, are mounted behind the windows 30 and 31 on the front face of the ruler 14. The accurate cutting position of a semi-elliptical slot in a workpiece is determined according to one of the scales 32 and 33. Alternatively, there may be only one scale of a desirable unit on the front surface of the ruler 14.

A blade case 34 pivotably movable around the support axis 15 is attached to the bottom of the base 6 as clearly seen in FIG. 2. The blade case 34 includes a protrusion 37 which engages with a belleville spring 36 of a screw 35 rotatably attached to the base 6. The cutter blade 5 is easily replaceable only by loosening the screw 35 to open the blade case 34 locked with the belleville spring 36. This structure saves much time and labor required for replacement of the cutter blade 5, compared with a conventional method which detaches the base 6 from the main body H by removing bolts.

In the biscuit jointer thus constructed, the clamp 26 pressed against the other end of the ruler 14 is loosened with the lever 27 attached on the other end of the ruler guide 19, so that the opening 10 of the base 6 is located at a desirable cutting position on a workpiece. The ruler guide 19 is not detached from the ruler 14 under such unclamping conditions by the following effects: The linear guide 20 is pressed against the slide edge plane 14a formed on the predetermined end of the ruler 14; and The spur gear 25 of the screw 22 engages with the toothed rack 24 formed on the front face of the ruler 14 and is pressed against the rack 24 by means of the leaf spring 23.

Rotation of the screw 22 moves the spur gear 25 along the toothed rack 24, that is, moves the ruler guide 19 along the ruler 14 in vertical direction. The accurate cutting position is determined according to the scale 32 or 33 of the ruler 14 through the window 30 or 31 of the ruler guide 19.

After the fine adjustment of the cutting position, the clamp 26 is tightened with the lever 27. Here the clamp 26 presses the other end of the ruler 14 in the direction of the linear guide 20 of the ruler guide 19. The pressure of the leaf spring 23 and the clamping force of the clamp 26 to press the ruler 14 against the linear guide 20 secures fixation of the ruler guide 19 to the ruler 14 at the accurate cutting position.

In the structure of the above embodiment, the ruler guide is securely fixed to the ruler by the contact of the linear guide with the slide edge plane and pressure of the leaf spring against the contact. There is no play between the ruler and the ruler guide, and the ruler guide is thereby kept completely level during the fine adjustment of the vertical position or angular orientation of the ruler guide.

The sufficient horizontality of the ruler guide allows the fine adjustment according to only one scale attached to the ruler. The ruler may thus have scales of two different units, for example, inch and millimeter, on the front face thereof.

The rack and pinion arrangement of the feed gear structure allows the ruler guide to smoothly move along the ruler in vertical direction. In the embodiment, the rack is used only for the movement of the ruler guide relative to the ruler and does not require high working accuracy like the conventional biscuit jointer having the rack and pinion arrangement for the movement and engagement. It is clearly understood that the above embodiment is only illustrative and not restrictive in any sense since the invention may be embodied in other forms without departing from the scope or spirit of essential characteristics thereof. The following are examples of typical modification.

Although the ruler has the slide edge plane and the ruler guide has the linear guide in the above embodiment, alternative arrangement is also allowable, that is, the ruler has a linear guide and the ruler guide has a slide edge plane. The clamping mechanism and the feed gear mechanism may also be attached in different ways; for example, the clamping mechanism is attached to press the ruler guide against the ruler. The feed gear mechanism may include a ball thread, and the clamping mechanism may include a vertically extending guide groove and an aperture locked with a bolt and nut to restrain the movement of the ruler guide or the ruler relative to the ruler or the ruler guide.

The spirit and scope of the present invention is limited only by the terms of the appended claims.

What is claimed is:

1. A biscuiter jointer comprising
a circular cutter blade,
a base accommodating said cutter blade,
a housing containing a motor for driving said cutter blade and being slidable relative to said base,
a ruler disposed adjacent one end of said base to abut against an end face of a workpiece, and
a ruler guide abutting against planar surface perpendicular to the end face of the workpiece to be vertically slidable along said ruler,
either said ruler or said ruler guide having a vertical slide edge plane on a predetermined end thereof, and
the other of said ruler of said ruler guide having a linear guide on the predetermined end thereof which slides against said slide edge plane.

2. A biscuit jointer in accordance with claim 1, further comprising spring means for applying pressure against the contact of said linear guide with said slide edge plane.

3. A biscuit jointer in accordance with claim 2, wherein said spring means comprises a leaf spring.

4. A biscuit jointer in accordance with claim 2, further comprising a feed gear mechanism disposed between said ruler and said ruler guide so as to move either the ruler or the ruler guide relative to the ruler guide or the ruler in vertical direction.

5. A biscuit jointer in accordance with claim 4, wherein said feed gear mechanism is formed in the vicinity of said linear guide and said slide edge plane.

6. A biscuit jointer in accordance with claim 5, wherein said feed gear mechanism comprises a rack and pinion arrangement.

7. A biscuit jointer in accordance with claim 4, wherein said ruler has one or plural scales on the front surface thereof.

8. A biscuit jointer in accordance with claim 4, further comprising a clamping mechanism for restraining the movement of said ruler guide or said ruler relative to said ruler or said ruler guide.

9. A biscuit jointer in accordance with claim 8, wherein said clamping mechanism comprises a clamp attached to one end of said ruler guide, opposite to the predetermined end having the linear guide, by means of a hexagonal nut and a bolt.

10. A biscuit jointer in accordance with claim 9, wherein said clamp comprises a urethane rubber sheet to ensure the fixation to said ruler guide.

11. A biscuit jointer in accordance with claim 9, wherein said clamping mechanism further comprises a lever to tighten and loosen the engagement of said bolt with said hexagonal nut.

12. In a biscuit jointer having,
a circular blade,
a base accommodating said cutter blade,
a housing containing a motor for driving said cutter blade and being slidable relative to said base,
a ruler disposed on one end of said base to abut against and end face of a workpiece, and
a ruler guide abutting against a planar surface perpendicular to the end face of the workpiece to be vertically slidable along said ruler,
the improvement comprising
a vertical slide edge plane formed on a predetermined end of either said ruler or said ruler guide,
a linear guide mounted on the predetermined end of the other of said ruler of said ruler guide to slide against said slide edge plane, and
spring means for applying pressure against the contact of said linear guide with said slide edge plane.

13. In a biscuit jointer according to claim 12, the further improvement wherein said spring means comprises a leaf spring.

14. In a biscuit jointer according to claim 12, the further improvement wherein said biscuit jointer further comprises a feed gear mechanism disposed between said ruler and said ruler guide so as to move either the ruler or the ruler guide relative to the ruler guide or the ruler in a normally vertical direction.

15. In a biscuiter according to claim 14, the further improvement wherein said feed gear mechanism comprises a rack and pinion mechanism.

16. In a biscuit jointer according to claim 12, the further improvement comprising a clamping mechanism for restraining the movement of said one of ruler guide of said ruler relative to the other of said ruler or said ruler guide.

17. Biscuit jointer apparatus for selectively cutting opposed edges of a workpiece, said apparatus comprising a circular cutter blade, a base accommodating said cutter blade, a housing mounting a motor for driving said cutter blade and mounted with said base for being slidable relative to said base, a ruler mounted with said base and disposed adjacent one of said base for abutting against an end face of a workpiece disposed for said selective cutting, and a ruler guide slidable along said ruler along a normally vertical direction and for abutting against a planar surface perpendicular to an end face of the workpiece, one of said ruler and said ruler guide having a normally vertical slide edge plane and the other of said ruler and said ruler guide having a linear guide for sliding against said slide edge plane.

18. Biscuit jointer apparatus according to claim 17 further comprising spring means mounted for applying resilient pressure against the contact of said linear guide with said slide edge plane.

* * * * *